(12) United States Patent
Barczynski et al.

(10) Patent No.: US 9,027,971 B2
(45) Date of Patent: May 12, 2015

(54) OVER TRAVEL HOOD LATCH

(75) Inventors: Darek Barczynski, West Bloomfield, MI (US); Hongying Wang, Shanghai (CN); Jianjun Yu, Huaian (CN); Dikran Ghorghorian, Scarborough (CA)

(73) Assignee: Magna Closures Inc., Newmarket, Ontario (CA)

( * ) Notice: Subject to any disclaimer, the term of this patent is extended or adjusted under 35 U.S.C. 154(b) by 7 days.

(21) Appl. No.: 13/981,201

(22) PCT Filed: Jan. 20, 2012

(86) PCT No.: PCT/CA2012/000058
§ 371 (c)(1),
(2), (4) Date: Oct. 3, 2013

(87) PCT Pub. No.: WO2012/100328
PCT Pub. Date: Aug. 2, 2012

(65) Prior Publication Data
US 2014/0015258 A1 Jan. 16, 2014

Related U.S. Application Data

(60) Provisional application No. 61/436,233, filed on Jan. 26, 2011.

(51) Int. Cl.
*E05C 19/10* (2006.01)
*E05B 83/24* (2014.01)
*B60J 5/02* (2006.01)

(52) U.S. Cl.
CPC .. *E05B 83/24* (2013.01); *B60J 5/02* (2013.01); *Y10S 292/14* (2013.01)

(58) Field of Classification Search
USPC .......................................... 292/100, DIG. 14
See application file for complete search history.

(56) References Cited

U.S. PATENT DOCUMENTS 5,445,421 A * 8/1995 Ferrara .......................... 292/216
5,738,393 A * 4/1998 Chao .............................. 292/216
(Continued)

FOREIGN PATENT DOCUMENTS

| CA | 2518725 A | 9/2004 |
| CA | 2274069 C | 4/2005 |
| KR | 20020063325 A | 8/2002 |

OTHER PUBLICATIONS

International Search Report mailed on Apr. 2, 2012 (PCT/CA2012/000058).

*Primary Examiner* — Mark Williams
(74) *Attorney, Agent, or Firm* — Dickinson Wright PLLC (57) ABSTRACT

A hood latch having an extra-long fishmouth for enabling a vehicle hood to deflect downwardly upon impact, such as when hit by a pedestrian in a frontal crash. To prevent this deflection when the hood is slammed shut in ordinary use, a stop lever is pivotally mounted to the latch housing. The stop lever features first and second arms defining a slot therein. One arm has a proboscis thereon and is biased to align the slot with the fishmouth, with the proboscis jutting into the fishmouth. The proboscis receives an impact from the striker and rotates the stop lever to a blocking position wherein the non-proboscis arm intercepts the striker and prevents it from reaching the bottom end of the fishmouth. In the closed position the ratchet retains the striker at an intermediate depth in the fishmouth, enabling the striker to travel toward the bottom end thereof.

20 Claims, 7 Drawing Sheets

(56) References Cited

U.S. PATENT DOCUMENTS 5,853,060 A * 12/1998 Chao et al. .................. 180/69.2
7,261,337 B2   8/2007 Nakagome et al.
2006/0006660 A1   1/2006 Seo

* cited by examiner

OVER TRAVEL HOOD LATCH

CROSS-REFERENCE TO RELATED APPLICATIONS

This application is a U.S. National State of International Application No. PCT/CA2012/000058 filed Jan. 20, 2012 which claims priority to and the benefit of U.S. Provisional Application No. 61/436,233 filed Jan. 26, 2011. The entire disclosure of each of the above applications is incorporated herein by reference.

FIELD OF THE INVENTION

The invention relates to the art of automotive latches, specifically hood latches.

BACKGROUND OF THE INVENTION

The automotive industry is attempting to better protect pedestrians from head on collisions with vehicles. When a car hits a pedestrian in a front collision, the pedestrian is thrown up and often lands on the front hood of the vehicle and/or the windshield. In an effort to ameliorate the harshness of the impact, it would be desirable for the front hood to not be rigidly connected to the frame, but rather flexibly coupled so that the hood has some springiness to it to somewhat absorb the impact.

This causes issues for the design and construction of the front hood latch. On the one hand, the hood springiness is desired. On the other hand, the hood has to open and close, and upon closing the latch it is desirable for the latch to react to the hood slam in the manner that consumers have been accustomed to, i.e., solidly, without appearing to reciprocate due to the springiness in the system. The latch must also prohibit the hood from unduly moving due to road vibrations and wind load. The invention seeks to provide a solution to at least some of these objectives.

SUMMARY OF THE INVENTION

According to a first aspect of the invention a latch is provided having a housing with an extra long fishmouth for receiving a striker. The fishmouth has an open top end and a closed bottom end, the top and bottom ends defining a depth therebetween. A ratchet and pawl combination selectively retain the striker in the fishmouth, the ratchet moving between a closed position wherein the striker is retained in the fishmouth and an open position wherein the striker is free to exit the fishmouth, the pawl moving between a locking position wherein the pawl keeps the ratchet in the closed position and an unlocked position wherein the pawl permits the movement of the ratchet out of the closed position. The ratchet is biased to the open position and the pawl is biased to the closed position. A release mechanism is provided for urging the pawl out of the locking position. A stop lever is pivotally mounted to the housing. The stop lever has first and second arms defining a slot therein. The stop lever has a proboscis on one of the arms and is biased such that the slot generally aligns with the fishmouth with the proboscis jutting into or otherwise juxtaposed so as to interfere with the fishmouth. The stop lever is mounted and configured for the proboscis to receive an impact from the striker so as to overcome the bias and rotate the stop lever to a blocking position wherein the non-proboscis arm intercepts the striker and prevents it from reaching the bottom end of the fish mouth. As such, in the closed position the ratchet retains the striker at an intermediate depth in the fishmouth, enabling the striker to travel toward the bottom end of the fishmouth when an impact, such as a pedestrian collision, provides a sufficient force on the striker.

According to another aspect of the invention a three position hood latch is provided with a housing having a an extra long fishmouth for receiving a striker. The fishmouth having an open top end and a closed bottom end, the top and bottom ends defining a depth therebetween.

A ratchet is pivotally mounted to the housing. The ratchet is moveable between (i) a primary closed position wherein the ratchet is positioned to retain the striker in the fishmouth, (ii) a secondary closed position wherein the ratchet is positioned to retain the striker in the fishmouth at a depth closer to the fishmouth top than the primary closed position, and (iii) an open position wherein the striker is free to exit the fishmouth. The ratchet is biased towards the open position.

A pawl is pivotally mounted to the housing. The pawl is moveable between (i) a primary locking position wherein the pawl is positioned to keep the ratchet in the primary closed position, (ii) a secondary locking position wherein the pawl is positioned to keep the ratchet in the secondary closed position, and (iii) an unlocked position wherein the pawl permits the movement of the ratchet out of the secondary closed position. The pawl is biased towards the primary and secondary locking positions.

A release mechanism is provided, including a primary release lever mounted to the housing for urging the pawl out of the primary locking position and a secondary release lever mounted to the housing for urging the pawl out of the secondary locking position.

A stop lever is pivotally mounted to the housing. The stop lever has first and second arms defining a slot therebetween. The stop lever has a proboscis on one of the arms and is biased such that the slot generally aligns with the fishmouth with the proboscis jutting into the fishmouth. The stop lever is mounted and configured for the proboscis to receive an impact from the striker so as to overcome the bias and rotate the stop lever to a blocking position wherein the non-proboscis arm intercepts the striker and prevents it from reaching the bottom end of the fish mouth.

As such, in the primary closed position the ratchet retains the striker at an intermediate depth in the fishmouth, enabling the striker to travel toward the bottom end of the fishmouth when an impact, such as a pedestrian collision, provides a sufficient force on the striker.

Preferably, the hood latch includes a manually handled presenter slidably connected to the secondary release lever, with the presenter being biased to move away from the secondary release lever so as to effectively increase the reach thereof. The presenter is preferably disposed to abut against a vehicle hood.

Preferably, the pawl and secondary release lever pivot about different axes, with the pawl being disposed in the rotational path of the secondary release lever when the pawl is positioned in the secondary locking position, and the pawl not being positioned in the rotational path of the secondary release lever when the pawl is positioned in the primary locking position.

BRIEF DESCRIPTION OF THE DRAWINGS

The foregoing and other aspects of the invention will be more readily appreciated having reference to the drawings, wherein.

DETAILED DESCRIPTION OF PREFERRED EMBODIMENTS

In the description that follows, reference is made to directions such as up, down, vertical, horizontal, etc. Such directions are made with reference to the orientation of the figures in the drawings, and are not intended to be limiting.

Figure 1:
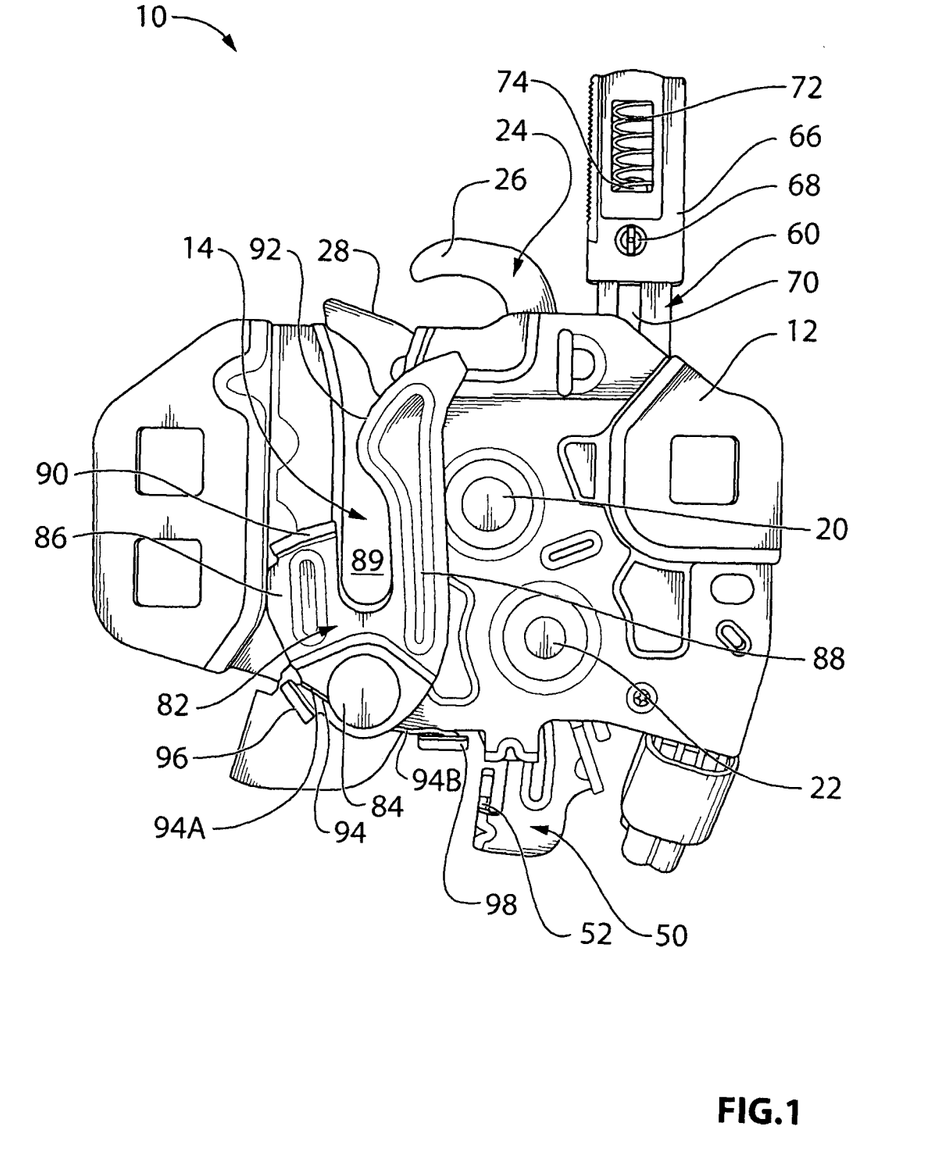
FIG. 1 is a front elevation view of a latch according to a preferred embodiment, the latch being shown in an open position.
Figure 2:
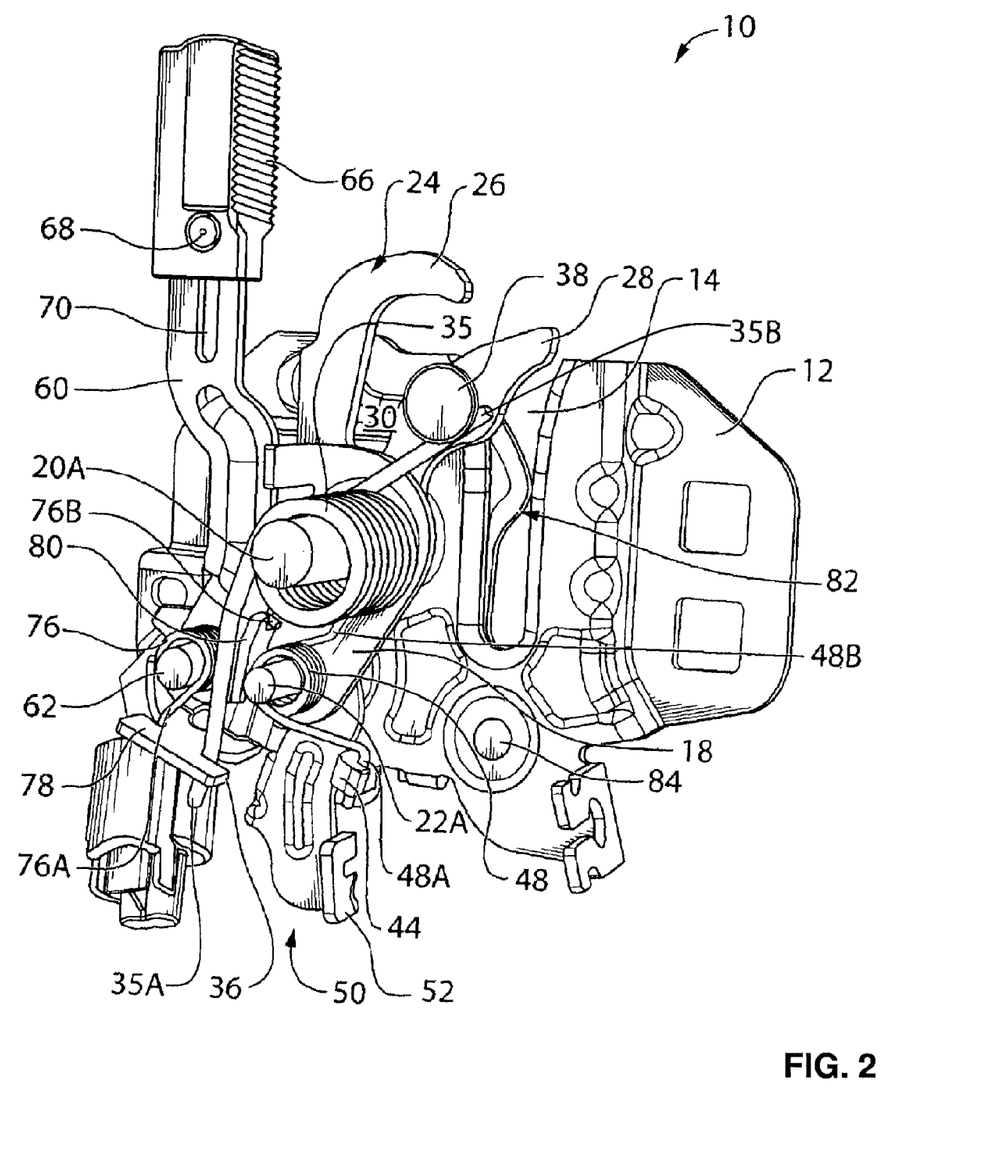
FIG. 2 is a rear perspective view of the latch shown in FIG. 1, the latch being shown in an open position.

FIG. 1 is a front elevation of a latch 10 according to the preferred embodiment, and FIG. 2 is a rear perspective thereof. Referring initially to these drawings, the latch 10 includes a frame plate 12 that incorporates a slot or fishmouth 14 for receiving the keeper of a striker 16 (not shown in FIGS. 1 and 2) mounted to the hood. The fishmouth 14 differs from the conventional in that it has an extra long depth to enable the hood to move downwardly upon impact as will be discussed in greater detail below.

Figure 3:
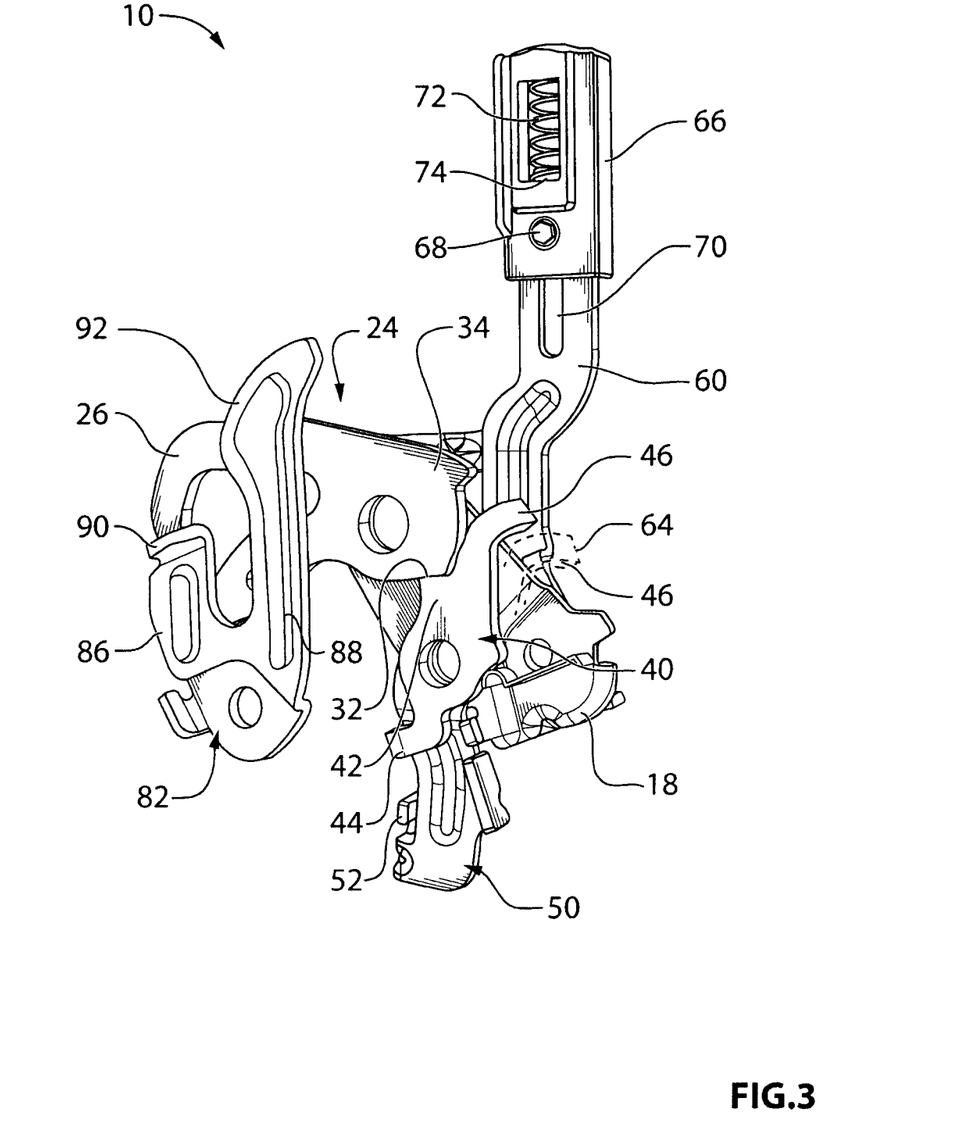
FIG. 3 is a front, fragmentary, perspective view of the latch shown in FIG. 1, with the housing and other components removed from view, wherein the latch is shown in a primary closed position.

The latch 10 also includes a cover plate 18 (seen best in FIGS. 2 and 3). The frame plate 12 and cover plate 18 are interconnected by first and second rivets 20, 22. The first and second rivets 20,22 each have integral shafts 20A, 22A extending beyond the cover plate 18.

The frame plate 12, cover plate 18 and interconnecting rivets provide a housing for the latch. Those skilled in the art will appreciate that a wide variety of alternative configurations may be deployed to provide the latch housing.

A fork ratchet 24 is pivotally mounted on the rivet 20 between the frame plate 12 and cover plate 18. The ratchet 24 includes a hook 26 and a lip 28 that extends beyond the hook. The ratchet 24 also includes a primary shoulder stop 32 and a pointed secondary shoulder stop 34.

The ratchet 24 is biased to an open position as shown in FIGS. 1 and 2 by a first biasing mechanism, for example a substantial torsion spring 35 that is mounted on the rivet shaft 20A and connected between the cover plate 18 and the ratchet 24. The torsion spring 35 has tangs 35A, 35B. The cover plate 18 features a slot 36 for receiving spring tang 35A, and the ratchet 24 includes a pin or rivet 38 for receiving spring tang 35B.

Referring additionally to the fragmentary perspective view of FIG. 3 (where plates 12 and 18, rivets and torsion springs are removed from view), a pawl 40 is pivotally mounted on the rivet 22 between the frame plate 12 and cover plate 18. The pawl 40 has a shoulder 42 that interacts with the primary and secondary shoulder stops 32, 34 of the ratchet 24. The pawl 40 also features a primary release tab 44 and a secondary release tab 46.

The pawl 40 is biased to a locking position as shown in FIG. 3 (where the ratchet 24 is shown in a primary closed position) by a second biasing mechanism, for example a torsion spring 48 that is mounted on rivet shaft 22A and connected between the other rivet shaft 20A and the pawl 40. The torsion spring 48 has tangs 48A, 48B. The primary release tab 44 receives spring tang 48A, and the other spring tang 48B is located under the other torsion spring 35 and supported directly by the other rivet shaft 20A.

A primary release lever 50 is also pivotally mounted on the rivet 22 between the frame plate 12 and the cover plate 18. The primary release lever 50 includes a tab 52 for connection to a release cable (not shown) that is connected to a handle (not shown) located in the vehicle compartment for initiating the opening of the hood latch.

The primary release lever 50 interacts with the pawl 40 via its primary release tab 44 and is thus also biased by torsion spring 48 into a non-engaged position.

A secondary release lever 60 is pivotally mounted on a pin 62 rigidly connected to the cover plate 18. The secondary release lever 60 has a bend in it that provides a face 64 for interacting with the pawl secondary release tab 46. The secondary release lever 60 also includes a presenter 66 which is intended to be gripped by hand in order to manually manipulate the secondary release lever 60. The presenter 66 is slidably disposed along the secondary release lever 60 preferably by a pin 68 and slot 70 connection. The presenter 66 encases a coil spring 72 which is mounted on a tip 74 of the secondary release lever 60 and urges the presenter 66 upwards.

The secondary release lever 60 is biased to a non-engaged position as shown FIG. 1, 2 or 3 by a fourth biasing mechanism, for example a torsion spring 76 that is mounted on the pin 62 and connected between the cover plate 18 and the secondary release lever 60. The torsion spring 76 has tangs 76A, 76B. The cover plate 18 features a slot 78 for receiving spring tang 76A, and the secondary release lever 60 includes a tab 80 for receiving spring tang 76B.

The primary and secondary release levers 50 and 60 provide a release mechanism for opening the latch.

A forked stop lever 82 is pivotally mounted on a pin 84 connected to the frame plate 12. The stop lever 82, seen best in FIG. 1, is generally U or pincer-shaped, having a short stop arm 86 and a longer actuation arm 88 which together define a slot 89 therebetween. The stop arm 86 has a planar impact surface 90, and the actuation arm features a protuberance or proboscis 92.

The stop lever 82 is biased to a rest position as shown in FIGS. 1 and 2 by a third biasing mechanism, for example a torsion spring 94 that is mounted on the pin 84 and connected between the frame plate 12 and the stop lever 82. The torsion spring 94 has tangs 94A, 94B. The stop lever 82 features a tab 96 for receiving spring tang 94A, and the frame plate 12 includes a tab 98 for receiving spring tang 94B.

The latch 10 is shown in its primary closed position in FIG. 3, where the ratchet 24 is in a primary closed position and the pawl 40 is in a primary locking position with the pawl shoulder 42 abutting the ratchet primary shoulder stop 32.

In operation, to open the latch, the primary release lever 50 is engaged by pulling on the associated handle inside the vehicle compartment, causing the primary release lever 50 to rotate clockwise in FIG. 3. As the primary release lever 50 rotates, it will engage the pawl primary release tab 44 causing the pawl 40, which pivots along the same axis as the primary release lever 50, to rotate in the same direction (clockwise in FIG. 3). As the pawl 40 rotates, the pawl shoulder 42 will slip away from the ratchet primary shoulder stop 32, enabling the ratchet 24 to rotate (clockwise in FIG. 3) towards its open position due to the bias torque provided by torsion spring 35. However, the ratchet 24 is prevented from rotating to its open position due to the ratchet secondary shoulder stop 34, which will abut the pawl shoulder 42, placing the ratchet 24 into a secondary closed position and the pawl 40 into a secondary locking position.

In the secondary closed/locking position, the ratchet 24 repositions the pawl 40 slightly causing the pawl secondary release tab 46 to come into the path of the secondary release lever interaction face 64 as indicated by the partial stippled lines 46'. To open the latch, the secondary release lever 60 must be manually pivoted clockwise in FIG. 3. It should also be noted that in the secondary closed/locking position, due to the repositioning of the ratchet 24 in comparison to its primary closed position, the hood becomes slightly elevated leaving a gap for manual access to the secondary release lever 60. The latch presenter 66 is urged upwards due the coil spring 72, extending the reach of the secondary release lever yet still leaving a small gap between the top of the presenter and the hood inner surface to allow for easy movement of the secondary lever. The presenter 66 is preferably manufactured in a high contrast color, e.g., yellow, to enable persons peering into the gap to ascertain the location of the secondary release lever 60. This is particularly useful when the hood latch is located in a non-conventional location. For example, when a retracting hoods is deployed for pedestrian protection purposes, the system may employ two hood latches 10 at opposite corners of the hood.

When the secondary release lever 60 is manually pivoted clockwise in FIG. 3, the pawl 40 is also caused to rotate clockwise into an open position whereby the pawl shoulder 42 slips away from the ratchet secondary shoulder stop 34, enabling the ratchet 24 to rotate completely into its open position as shown in FIGS. 1 and 2 as a result of the bias torque on the ratchet 24.

Figure 4:
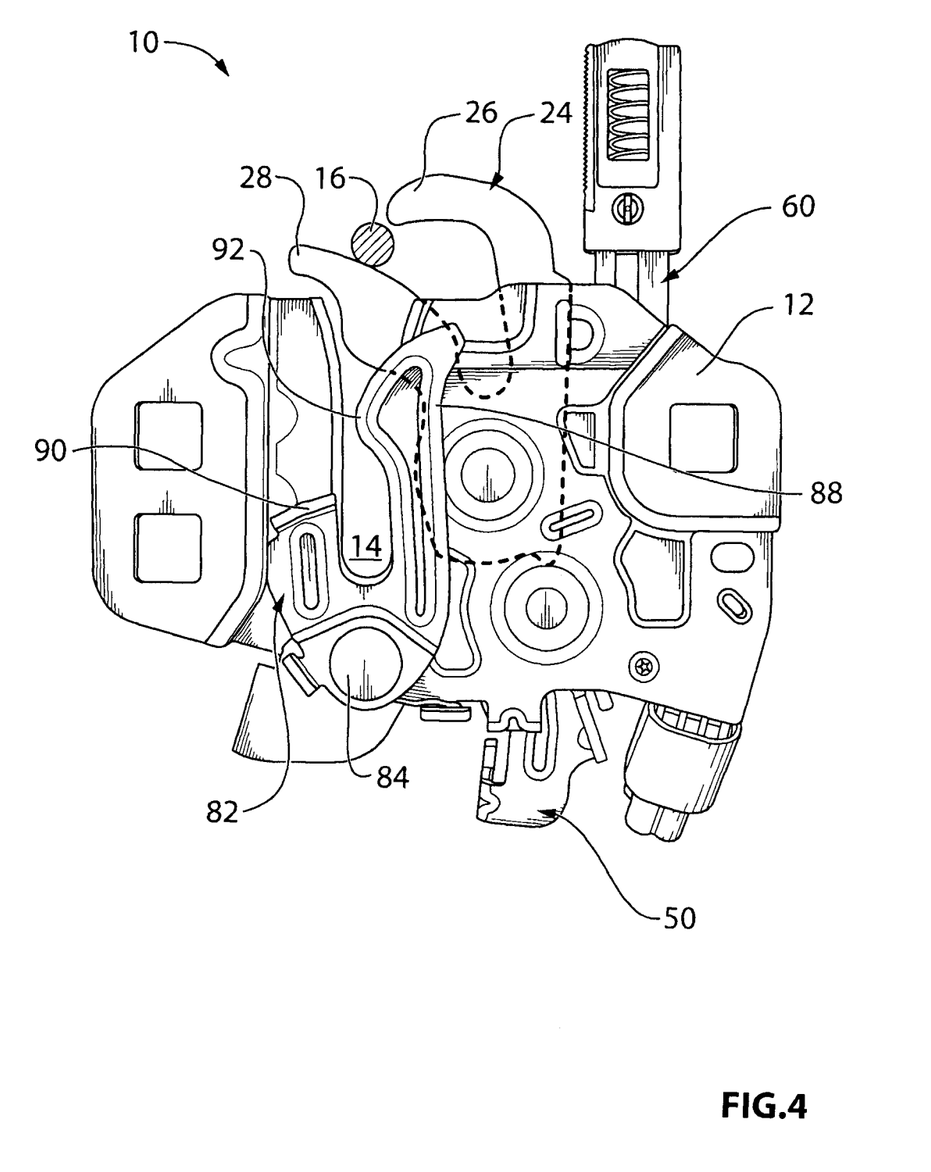
FIG. 4 is a front elevation view of the latch shown in FIG. 1 in a first position in the process of closing.
Figure 5:
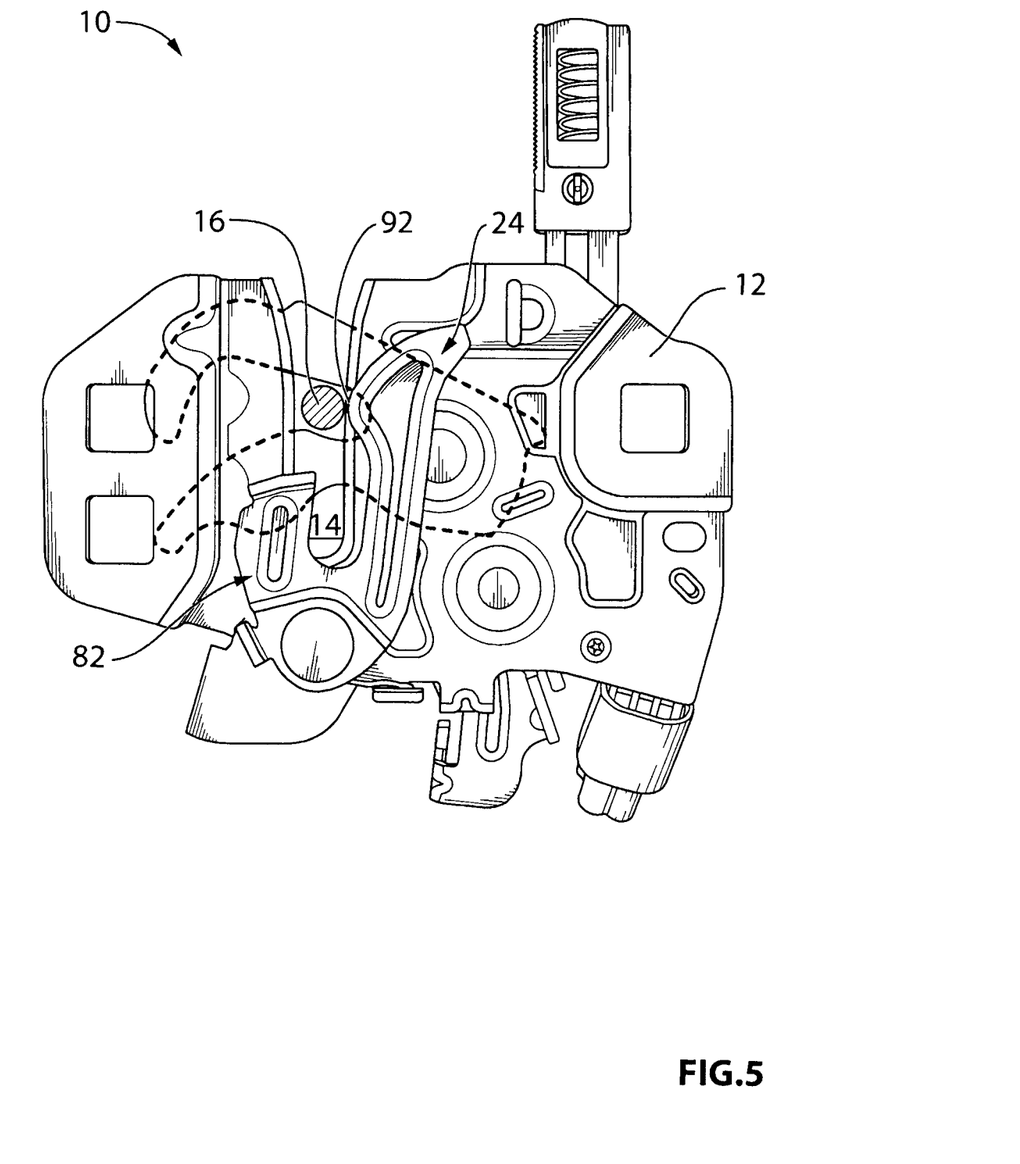
FIG. 5 is a front elevation view of the latch shown in FIG. 1 in a second position in the process of closing.
Figure 6:
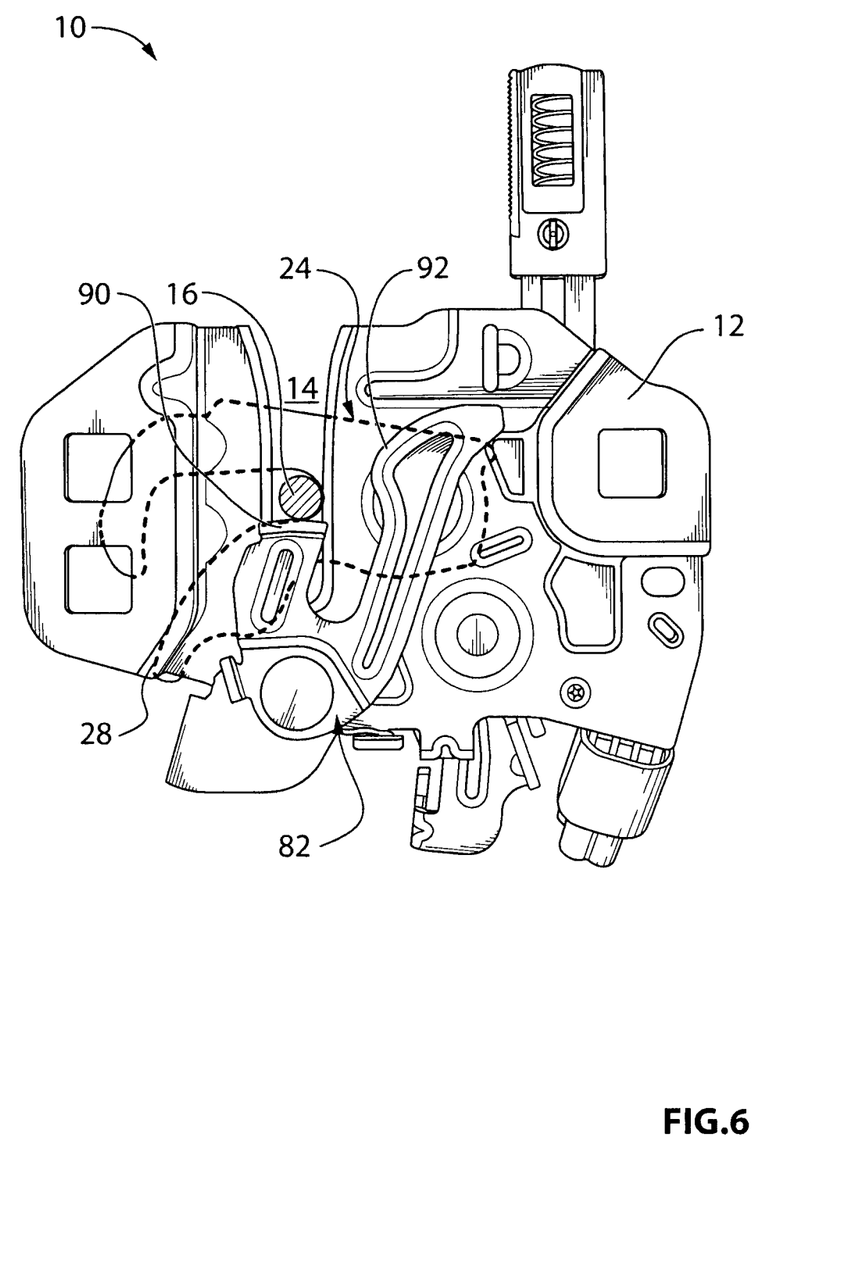
FIG. 6 is a front elevation view of the latch shown in FIG. 1 in a third position in the process of closing.
Figure 7:
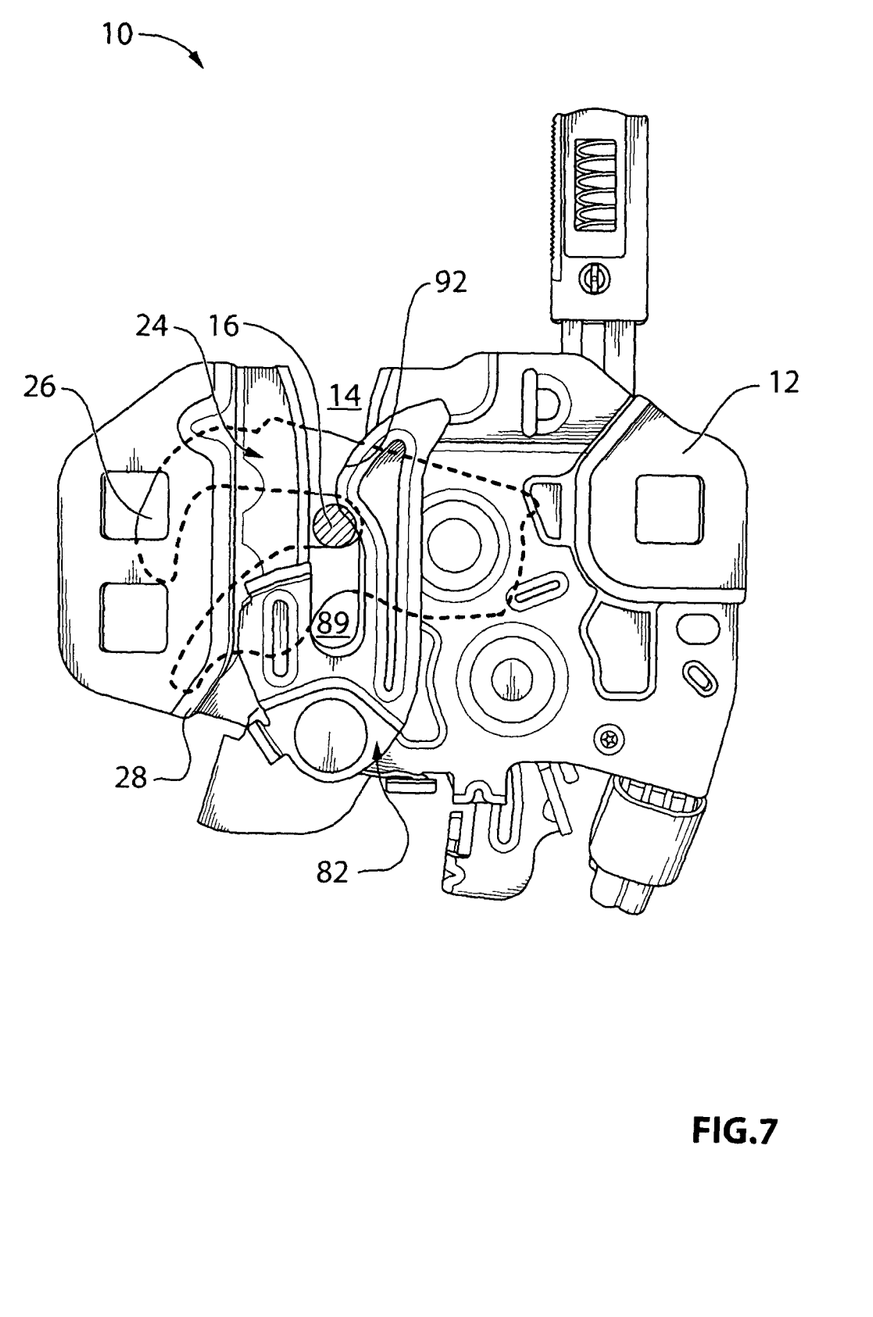
FIG. 7 is a front elevation view of the latch shown in FIG. 1 in the primary closed position.

The stop lever 82 comes into play on closing. As illustrated in FIG. 4, the striker 16 first contacts the ratchet lip 28 to begin rotating the ratchet 24 towards its primary closed position (counterclockwise in FIG. 4). As seen in FIG. 5, as the striker 16 descends into the fishmouth 14 the striker 16 impacts the proboscis 92 of the stop lever 82 which is juxtaposed to interfere with the fishmouth. The inertia provided by the impact causes the stop lever 82 to overcome the bias torque provided by torsion spring 94 and pivot the stop lever (clockwise) to the position shown in FIG. 6, where its planar impact surface 90 receives the impact of the striker 16 and prevents it from descending all the way to the bottom of the fishmouth 14. As seen in FIG. 7, the striker 16 will slightly recoil backwards up the fishmouth 14 but the ratchet 24 will be captured by the pawl 40 in the primary closed/locking position preventing the ratchet 24 and striker 16 entrained therein from backing out of the fishmouth 14. The bias torque on the stop lever 82 causes it to revert substantially back to its rest position, where the slot 89 in the stop lever 82 aligns with the fishmouth 14. In this position, in the event the ratchet 24 receives a force that exceeds the substantial bias torque provided by the ratchet torsion spring 35 such as may occur when a pedestrian impacts the front hood, the striker 16 is free to move further downwardly into the fishmouth 14 thus providing the hood with a vertically downward degree of freedom.

Thus, the latch 10 can react to a hood slam in the solid manner that consumers have been accustomed to without appearing to unduly recess downwardly or reciprocate due to the vertical degree of freedom provided by the extra long fishmouth 14. It will also be appreciated that if the hood is closed slowly and not slammed, the stop lever may not engage as there is no need in this case.

Those skilled in the art will appreciate that while the stop lever has been shown applied with respect to a three position latch moveable between primary closed, secondary closed and open positions, the same effect may be achieved if the stop lever is applied to a two position latch where a ratchet and pawl combination move only between closed and open positions. In the latter case, the latch release mechanism does not need to employ two levers to open the latch.

While the above describes a particular embodiment(s) of the invention, it will be appreciated that modifications and variations may be made to the detailed embodiment(s) described herein without departing from the spirit of the invention.

The invention claimed is:

1. A latch, comprising:
   a housing, the housing having a fishmouth for receiving a striker, the fishmouth having an open top end and a closed bottom end, the top and bottom ends defining a depth therebetween;
   a ratchet and pawl combination for selectively retaining the striker in the fishmouth, the ratchet moving between a closed position wherein the striker is retained in the fishmouth and an open position wherein the striker is free to exit the fishmouth, the pawl moving between a locking position wherein the pawl keeps the ratchet in the closed position and an unlocked position wherein the pawl permits the movement of the ratchet out of the closed position; the ratchet being biased by a first biasing mechanism to the open position and the pawl being biased by a second biasing mechanism to the locking position;
   a release mechanism for urging the pawl out of the locking position; and
   a stop lever pivotally mounted to the housing, the stop lever having first and second arms defining a slot therebetween, the stop lever having a proboscis on one of the arms and being biased by a third biasing mechanism such that the slot generally aligns with the fishmouth with the proboscis juxtaposed to interfere with the fishmouth, the stop lever being mounted and configured for the proboscis to receive an impact from the striker so as to overcome the bias and rotate the stop lever to a blocking position wherein the non-proboscis arm intercepts the striker and prevents it from reaching the bottom end of the fishmouth;
   whereby in the closed position the ratchet retains the striker at an intermediate depth in the fishmouth, enabling the striker to travel toward the bottom end of the fishmouth.

2. A hood latch according to claim 1, including a cover plate connected to the housing by a first shaft, and wherein the first biasing mechanism is a first spring mounted on the first shaft, the first spring extends between first and second tangs, the cover plate receives the first tang of the first spring, and the ratchet receives the second tang of the first spring.

3. A hood latch according to claim 2, including a second shaft interconnecting the cover plate and the housing, and wherein the second biasing mechanism is a second spring mounted on the second shaft, the second spring extends between first and second tangs, the pawl receives the first tang of the second spring, and the second tang of the second spring is located under the first spring.

4. A hood latch according to claim 1, wherein the stop lever is pivotally mounted to the housing by a pin, the third biasing mechanism is a third spring mounted on the pin, the third spring extends between first and second tangs, the stop lever receives the first tang of the third spring, and the housing receives the second tang of the third spring.

5. A hood latch according to claim 1, wherein the closed position of the ratchet includes a primary closed position wherein the ratchet is positioned to retain the striker in the fishmouth and a secondary closed position wherein the ratchet is positioned to retain the striker in the fishmouth at a depth closer to the fishmouth top than the primary closed position;

the locking position of the pawl includes a primary locking position wherein the pawl is positioned to keep the ratchet in the primary closed position and a secondary locking position wherein the pawl is positioned to keep the ratchet in the secondary closed position; and the release mechanism includes a primary release lever mounted to the housing for urging the pawl out of the primary locking position and a secondary release lever mounted to the housing for urging the pawl out of the secondary locking position.

6. A hood latch according to claim 1 wherein the non-proboscis arm of the stop lever rotates toward the fishmouth and the proboscis arm rotates away from the fishmouth when the striker impacts the proboscis.

7. A hood latch, comprising:

a housing, the housing having a fishmouth for receiving a striker, the fishmouth having an open top end and a closed bottom end, the top and bottom ends defining a depth therebetween;

a ratchet pivotally mounted to the housing, the ratchet moveable between (i) a primary closed position wherein the ratchet is positioned to retain the striker in the fishmouth, (ii) a secondary closed position wherein the ratchet is positioned to retain the striker in the fishmouth at a depth closer to the fishmouth top than the primary closed position, and (iii) an open position wherein the striker is free to exit the fishmouth; the ratchet being biased by a first biasing mechanism towards the open position;

a pawl pivotally mounted to the housing, the pawl moveable between (i) a primary locking position wherein the pawl is positioned to keep the ratchet in the primary closed position, (ii) a secondary locking position wherein the pawl is positioned to keep the ratchet in the secondary closed position, and (iii) an unlocked position wherein the pawl permits the movement of the ratchet out of the secondary closed position; the pawl being biased by a second biasing mechanism towards the primary and secondary locking positions;

a release mechanism comprising a primary release lever mounted to the housing for urging the pawl out of the primary locking position and a secondary release lever mounted to the housing for urging the pawl out of the secondary locking position;

and a stop lever pivotally mounted to the housing, the stop lever having first and second arms defining a slot therein, the stop lever having a proboscis on one of the arms and being biased by a third biasing mechanism such that the slot generally aligns with the fishmouth with the proboscis juxtaposed to interfere with the fishmouth, the stop lever being mounted and configured for the proboscis to receive an impact from the striker so as to overcome the bias and rotate the stop lever to a blocking position wherein the non-proboscis arm intercepts the striker and prevents it from reaching the bottom end of the fishmouth;

whereby in the primary closed position the ratchet retains the striker at an intermediate depth in the fishmouth, enabling the striker to travel toward the bottom end of the fishmouth.

8. A hood latch according to claim 7, including a manually handled presenter slidably connected to the secondary release lever, the presenter being biased by a fourth biasing mechanism to move away from the secondary release lever so as to effectively increase the reach thereof.

9. A hood latch according to claim 8, wherein the presenter is disposed to abut against a vehicle hood.

10. A hood latch according to claim 8, wherein the fourth biasing mechanism is a fourth spring mounted on the secondary release lever and encased by the presenter.

11. A hood latch according to claim 7, wherein the pawl and secondary release lever pivot about different axes, the pawl being disposed in the rotational path of the secondary release lever when the pawl is positioned in the secondary locking position, the pawl not being positioned in the rotational path of the secondary release lever when the pawl is positioned in the primary locking position.

12. A hood latch according to claim 7, including a cover plate connected to the housing by a first shaft, and wherein the first biasing mechanism is a first spring mounted on the first shaft, the first spring extends between first and second tangs, the cover plate receives the first tang of the first spring, and the ratchet receives the second tang of the first spring.

13. A hood latch according to claim 12, including a second shaft interconnecting the cover plate and the housing, and wherein the second biasing mechanism is a second spring mounted on the second shaft, the second spring extends between first and second tangs, the pawl receives the first tang of the second spring, and the second tang of the second spring is located under the first spring.

14. A hood latch according to claim 7, wherein the stop lever is pivotally mounted to the housing by a pin, the third biasing mechanism is a third spring mounted on the pin, the third spring extends between first and second tangs, the stop lever receives the first tang of the third spring, and the housing receives the second tang of the third spring.

15. A hood latch, comprising:

a housing, the housing having a fishmouth for receiving a striker connected to a vehicle hood, the fishmouth having an open top end and a closed bottom end, the top and bottom ends defining a depth therebetween;

a ratchet pivotally mounted to the housing, the ratchet moveable between (i) a primary closed position wherein the ratchet is positioned to retain the striker in the fishmouth, (ii) a secondary closed position wherein the ratchet is positioned to retain the striker in the fishmouth at a depth closer to the fishmouth top than the primary closed position, and (iii) an open position wherein the striker is free to exit the fishmouth; the ratchet being biased by a first biasing mechanism towards the open position;

said fishmouth being sized such that in the closed position the ratchet retains the striker at an intermediate depth in the fishmouth, enabling the striker to travel toward the bottom end of the fishmouth when the vehicle hood is depressed with sufficient force;

a pawl pivotally mounted to the housing, the pawl moveable between (i) a primary locking position wherein the pawl is positioned to keep the ratchet in the primary closed position, (ii) a secondary locking position wherein the pawl is positioned to keep the ratchet in the secondary closed position, and (iii) an unlocked position wherein the pawl permits the movement of the ratchet out of the secondary closed position; the pawl being biased by a second biasing mechanism towards the primary and secondary locking positions;

a release mechanism comprising a primary release lever mounted to the housing for urging the pawl out of the primary locking position and a secondary release lever mounted to the housing for urging the pawl out of the secondary locking position; and a manually handled presenter slidably connected to the secondary release lever, the presenter being biased by a fourth biasing mechanism to move away from the secondary release lever so as to abut against the vehicle hood.

16. A hood latch according to claim 15, including a cover plate connected to the housing by a first shaft, and wherein the first biasing mechanism is a first spring mounted on the first shaft, the first spring extends between first and second tangs, the cover plate receives the first tang of the first spring, and the ratchet receives the second tang of the first spring.

17. A hood latch according to claim 16, including a second shaft interconnecting the cover plate and the housing, and wherein the second biasing mechanism is a second spring mounted on the second shaft, the second spring extends between first and second tangs, the pawl receives the first tang of the second spring, and the second tang of the second spring is located under the first spring.

18. A hood latch according to claim 15, including a stop lever pivotally mounted to the housing, the stop lever having first and second arms defining a slot therebetween, the stop lever having a proboscis on one of the arms and being biased by a third biasing mechanism such that the slot generally aligns with the fishmouth with the proboscis juxtaposed to interfere with the fishmouth, the stop lever being mounted and configured for the proboscis to receive an impact from the striker so as to overcome the bias and rotate the stop lever to a blocking position wherein the non-proboscis arm intercepts the striker and prevents it from reaching the bottom end of the fishmouth; whereby in the closed position the ratchet retains the striker at an intermediate depth in the fishmouth, enabling the striker to travel toward the bottom end of the fishmouth.

19. A hood latch according to claim 1 8, wherein the stop lever is pivotally mounted to the housing by a pin, the third biasing mechanism is a third spring mounted on the pin, the third spring extends between first and second tangs, the stop lever receives the first tang of the third spring, and the housing receives the second tang of the third spring.

20. A hood latch according to claim 15, wherein the fourth biasing mechanism is a fourth spring mounted on the secondary release lever and encased by the presenter.

* * * * *